US006162375A

United States Patent [19]

Crouch et al.

[11] Patent Number: 6,162,375

[45] Date of Patent: Dec. 19, 2000

[54] FUGITIVE COLOR FIRE RETARDANT COMPOSITION FOR AERIAL APPLICATION

[75] Inventors: Robert L. Crouch, Phoenix; Darla D. Burchert, Surprise, both of Ariz.

[73] Assignee: Fire-Trol Holdings, L.L.C., Phoenix, Ariz.

[21] Appl. No.: 09/139,640

[22] Filed: Jul. 20, 1998

Related U.S. Application Data

[63] Continuation-in-part of application No. 08/492,471, Jun. 20, 1995, abandoned, which is a continuation-in-part of application No. PCT/US94/08226, Nov. 30, 1994.

[51] Int. Cl.[7] .......... C09K 21/02

[52] U.S. Cl. .......... 252/603; 252/601

[58] Field of Search .......... 252/601, 603

[56] References Cited

U.S. PATENT DOCUMENTS

| | | | |
|---|---|---|---|
| 3,196,108 | 7/1965 | Nelson | 252/2 |
| 3,257,316 | 6/1966 | Langguth et al. | 252/2 |
| 3,960,739 | 6/1976 | Lacey | 252/2 |
| 4,168,239 | 9/1979 | Mertz et el. | 252/2 |
| 4,447,336 | 5/1984 | Vandersall | 252/7 |
| 4,822,524 | 4/1989 | Strickland | 252/603 |
| 4,839,065 | 6/1989 | Vandersall | 252/603 |
| 6,019,176 | 2/2000 | Crouch | 169/46 |

*Primary Examiner*—Joseph D. Anthony
*Attorney, Agent, or Firm*—Drummond & Duckworth

[57] ABSTRACT

In a fugitive color fire retardant composition, the colorant initially colors the composition to a hue which contrasts with the hue of ground vegetation. A non-fugitive component is included in the colorant, in an amount sufficient to provide improved aerial visibility when the composition is first aerially applied to the vegetation. However, the amount of non-fugitive pigment is less than an amount which would prevent the composition from fading after application to an acceptable neutral hue.

4 Claims, 5 Drawing Sheets

FUGITIVE COLOR FIRE RETARDANT COMPOSITION FOR AERIAL APPLICATION

This application is a continuation-in-part of application, Ser. No. 08/492,471, filed Jun. 20, 1995, abandoned which was a continuation-in-part of our international application, PCT/US94/08226, filed Nov. 30, 1994.

NATURE OF THE INVENTION

This invention relates to fire retardant compositions which are specially adapted for aerial application, to combat or prevent the spread of wildfires.

More particularly, the invention concerns a fugitive color fire retardant composition, having improved aerial visibility after it is first aerially applied to ground vegetation, but which fades over time and under ambient conditions to another color (hue).

BACKGROUND OF THE INVENTION

In the early 1960's aerial application of fire retardant compositions, to prevent or retard the spread of forest fires, range fires, etc., became very widespread. Typically, these fire retardant compositions contained an electrolytic fire suppressing salt such as ammonium phosphate, ammonium sulfate, and the like and also included other components such as viscosity modifiers, corrosion inhibitors and coloring agents such as pigments or dyes. Typical fire retardant compositions of the type described above are disclosed in the patents to Nelson, U.S. Pat. No. 3,196,108, and to Langguth et al., U.S. Pat. Nos. 3,257,316 and 3,309,324. These compositions generally consisted of an aqueous slurry or solution of a fire suppressing salt such as ammonium phosphate or ammonium sulfate and a thickening agent such as attapulgite clay, guar gum or the like. Coloring agents such as red iron oxide were included to improve the visibility of the material after it was dropped. More recently, ammonium polyphosphate liquids, containing coloring agents and corrosion inhibitors, have been widely employed. Such liquid polyphosphate fire retardant compositions are disclosed in the patents to Nelson, U.S. Pat. No. 3,370,890 and to Lacey, U.S. Pat. No. 3,960,735.

Fire retardant compositions containing other thickeners, stabilizers and the like are disclosed in the patents to Strickland, U.S. Pat. No. 4,822,524; Morganthaler, U.S. Pat. No. 3,634,234; Kegler et al., U.S. Pat. No. 4,606,831; Vandersall, U.S. Pat. No. 4,447,336; Adl et al., U.S. Pat. No. 4,447,338; and Vandersall, U.S. Pat. Nos. 4,839,065 and 4,983,326.

Fire retardant compositions are typically manufactured as dry or liquid "concentrates". These concentrates are shipped and stored in such form until just prior to use. Then, the concentrate is mixed with water to form the final diluted "mixed" fire retardant composition. This mixed retardant composition is then pumped in the tanker aircraft for transport to and dropping at the wildfire site. In some instances a dry concentrate is first mixed with an initial quantity of water to provide an intermediate liquid concentrate and this intermediate liquid concentrate is then further diluted just before use to the final diluted mixed form.

The active fire suppressing components employed in such retardant compositions include any of the well known electrolytic fire suppressing salts, e.g., such as are disclosed in the patent to Nelson U.S. Pat. No. 3,196,108, as well as the more recently employed liquid ammonium polyphosphate materials, as disclosed in the patent to Lacey U.S. Pat. No. 3,960,735; ammonium sulfate, as disclosed in the patent to Crouch U.S. Pat. No. 4,176,071; and mixtures of these salts with themselves and with other salts.

In general, the active fire retardant components are compounds or a mixture of compounds that degrade or decompose at temperatures below the ignition temperature of the fuels to be protected (e.g., cellulose), thereby releasing a mineral acid, such as phosphoric acid or sulfuric acid. Among the various fire retardants typically used in fire retardant mixtures and which might be used in the compositions of this invention are monoammonium orthophosphate, diammonium orthophosphate, monoammonium pyrophosphate, diammonium pyrophosphate, triammonium pyrophosphate, tetraammonium pyrophosphate, ammonium polyphosphate, substituted ammonium polyphosphate, amide polyphosphate, melamine polyphosphate, ammonium-alkali metal mixed salts of orthophosphate, ammonium-alkali metal mixed salts of pyrophosphate, ammonium-alkali metal mixed salts of polyphosphate, ammonium-alkaline earth metal mixed salts of orthophosphate, ammonium-alkaline earth metal mixed salts of pyrophosphate, ammonium-alkaline earth metal mixed salts of polyphosphate, ammonium sulfate, liquid ammonium polyphosphates and blends thereof. Some liquid ammonium polyphosphates may be too dilute in their commercial forms for application as fire retardants but, other retardants, such as those noted above, may be mixed with a liquid ammonium polyphosphate until a minimum acceptable concentration is obtained. Ammonium polyphosphate is often called polyammonium phosphate, and commonly contains other ammonium phosphate such as pyro and metaphosphates, and the alkali metal equivalents thereof, as well as a blend of phosphate polymers. Such polyammonium phosphates are often referred to as 10-34-0, 11-37-0, 12-40-0, 13-42-0 or the like, where the first number indicates the percentage of nitrogen in the blend, the middle number indicates the percentage phosphate in the blend and the last number indicates the percentage potash in the blend.

The fire retardant components may also include thickening agents, which include standard thickeners such as galactomannan guar gum compositions and derivatives thereof attapulgite clay, carboxymethylcellulose and derivatives thereof, and the like. The thickening agent is employed to maintain the viscosity of the diluted mixed fire retardant composition, for example, at between about 50 centipoise and about 2000 centipoise for aerial application. In addition, the fire retardant components, in the concentrate or in the final diluted mixed form, may also typically include various adjuvants such as corrosion inhibitors, flow conditioners, spoilage inhibitors, stabilizers and the like, and carriers for these adjuvants, in accordance with art recognized principles.

DESCRIPTION OF THE PRIOR ART

When such fire retardant compositions, in final diluted mixed form for aerial application, are applied by dropping from fixed-wing or helicopter aircraft, successive "drops" are often made by the aircraft to form a fire-fighting line. Under these circumstances, it is important for the pilot of the aircraft to be able to visually determine where the preceding loads were dropped, such that the pilot can drop the load from the aircraft to form a continuation of this line. Since the fire retardant components (described above) may be colorless or may be of colors which do not contrast well with the ground or vegetation, it has been common practice to mix coloring agents with the fire retardant composition components. Coloring agents are used to give the fire retardant compositions a color (hue) which contrasts with the hue of the ground vegetation, thereby enhancing the ability of the aircraft pilot to determine where the last loads of fire retardants were dropped in constructing a fire-fighting line. Prior art coloring agents have included pigments which are dispersible in the liquid fire retardant compositions or soluble therein, most commonly red iron oxide or various water soluble dyes. Such coloring agents were remarkably effective in enhancing the aerial visibility of fire retardant compositions after they were applied. However, certain prior art coloring agents, especially red iron oxide, were very "colorfast", such that the ground and structures (if any) to which the prior art fire retardant compositions were applied, remained permanently or semi-permanently stained. Consequently, certain government fire-fighting agencies have, more recently, required that aerially applied fire retardant compositions have so-called "fugitive" coloring agents, such that the color of the compositions would fade over a short time, e.g., 30 days, to a color which did not objectionably contrast with the ground and ground vegetation.

Several dyes and pigments (encapsulated dyes) have been identified which impart a distinctive hue to fire retardant compositions, which contrasts with ground vegetation, but which allow the fire retardant compositions to fade in a short time to a "neutral" color, i.e., the color the fire retardant compositions would have exhibited without the addition of such fugitive agents which may be colorless or a color which blends with the natural color of the vegetation and/or ground in the drop zone. However, although the fire retardant compositions themselves might be brilliantly colored by fugitive agents, after first application it was often difficult to locate the fire retardant drop zone. It has been found that the reduced visibility of these highly colored fugitive compositions is somewhat related to the viscosity of the fire retardant compositions themselves. Thus, more highly viscous fugitive compositions are somewhat easier to see on the vegetation, because they form a thicker coating. However, even highly viscous fugitive color compositions are sometimes difficult to visualize from an aircraft after dropping on various kinds of vegetation and under various lighting conditions.

It would be advantageous to provide fugitive color fire retardant compositions which exhibit improved aerial visibility after dropping. It would also be advantageous to achieve this result in an economical manner and without using any materials which are toxic to humans, animals, fish or to vegetation.

BRIEF DESCRIPTION OF THE INVENTION

Briefly, we have discovered a fugitive color liquid fire retardant composition for aerial application to ground vegetation which achieves these objectives. Our composition comprises fire retardant components, a colorant and a liquid carrier, typically an aqueous carrier. The colorant comprises a fugitive component and a non-fugitive component. The fire retardant components and the non-fugitive components have a first hue which is a color, i.e., either colorless or a color which blends with the normal vegetation and/or ground in the drop zone.

The colorant initially colors the fire retardant composition components to a second hue which contrasts with the hue of the ground vegetation. This may be due solely to the color imparted by the fugitive component or the color imparted by the combined fugitive/non-fugitive components.

The non-fugitive component of our colorant is present in an amount sufficient to improve the aerial visibility of the composition when it is first applied to the vegetation. However, the non-fugitive component is present in less than an amount which prevents the composition from thereafter fading a neutral color.

According to another embodiment of our invention, we provide a concentrate composition for preparing the liquid composition described above by dilution thereof with the aqueous carrier. The concentrate composition comprises the fire retardant components and the colorant and may include at least part of the liquid carrier.

In one embodiment, the concentrate is a dry composition. In another embodiment the concentrate is a liquid, suitable for later dilution with water to form the final mixed liquid fire retardant composition.

According to yet another embodiment of the invention, we provide an improved method for fighting wild fires, including the step of aerially applying a fire retardant composition, which includes fire retardant components, comprising a fire retarding salt, a fugitive color component, and further including a liquid carrier. Our improved method increases the aerial visibility of the fire retardant composition after aerial application and includes the step of incorporating a non-fugitive component into the fire retardant composition, before it is aerially applied. A sufficient amount of the non-fugitive component is added to increase the aerial visibility of the composition, but less than an amount which prevents the composition from fading, after application, to a neutral hue.

BRIEF DESCRIPTION OF THE DRAWINGS

The drawings are lined for color, as indicated in the legend on each drawing.

The above-described embodiments of the invention, and other and further embodiments will be apparent to those skilled in the art, from the following detailed description thereof, taken in conjunction with the drawings, which are "fading" graphs which illustrate the changes in color attributes of various fire retardant compositions of the invention and of the prior art with exposure to sunlight.

DEFINITIONS

Figure 1:
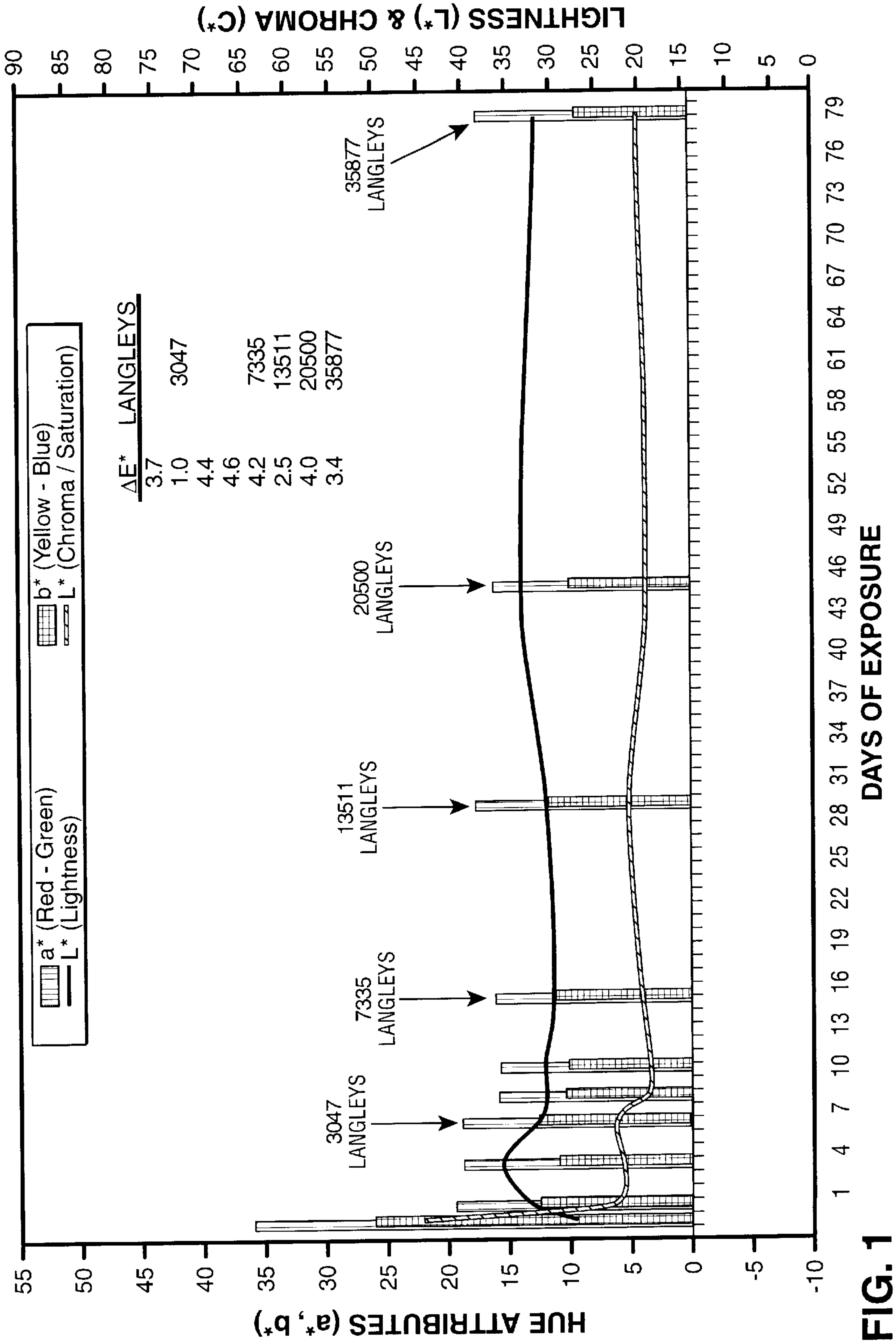
FIG. 1 illustrates the fading characteristics of the prior art composition of the Lacey '735 patent, containing both red iron oxide and 6 BL dye.

As used herein, the term "fire retardant components" means all of the components of the composition except the "colorant" and the liquid carrier, if any. The fire retardant components will include a fire retardant salt and may optionally include (and usually will include) other common ingredients of fire retardant formulations, e.g., corrosion inhibitors, spoilage inhibitors, flow conditioners, antifoaming agents, foaming agents, stability additives and thickening agents.

The term "colorant" means a combination of at least two components, namely, a fugitive component and a non-fugitive component.

The "fugitive component" is a dye or a dye which is dispersed in a matrix (i.e., a pigment), which fades over time and under ambient field conditions to a colorless or less highly colored hue. A number of such dyes and pigments are well known in the art. For example, many water-soluble dyes fade rapidly and there are so-called fluorescent pigments (fluorescent dyes encapsulated in a resin integument) which are suspendable in the fire retardant compositions and which also fade rapidly to provide the "fugitive" effect. Typical examples of prior art fugitive dyes and pigments include C. I. Basic Red I dye, 6 BL dye, Basic Violet II dye, Basic Yellow 40 and encapsulated-dye pigments which are available commercially, e.g., the "AX" series pigments, supplied by Day-Glo Color Corp., Cleveland, Ohio. At present, we prefer to employ encapsulated-dye fugitive pigments without uv absorbers, rather than using water soluble dyes because the encapsulated-dye pigments are less likely to stain.

The fugitive component is present in an amount which provides a color ("second hue") to the composition which is contrasts with the color of the vegetation and/or ground in the drop zone (normally green, blue-green and/or brown). Advantageously, the second hue is red, orange or pink.

The colorant also includes a "non-fugitive" component, i.e., a component which is insoluble in the carrier liquid and which, if colored, does not necessarily fade after aerial application of the fire retardant composition.

The non-fugitive component preferably has an index of refraction of at least 2.0. For example, prior art fire retardant compositions containing fugitive colorants and which also contain various clays and other insoluble materials, e.g., attapulgite clay, tricalcium phosphate, (components which have refractive indices below 2.0), do not have the improved aerial visibility exhibited by the compositions of the present invention, unless the amounts of such lower-index materials are so large that, particularly if the component is colored, the compositions are not "fugitive", i.e., they do not fade to a "neutral" color, i.e., either colorless or a color which blends with the normal color of the drop zone vegetation and/or ground. To achieve improved aerial visibility smaller quantities of non-fugitive components can be employed if the refractive index is higher and larger quantities of lower-index materials are required to achieve desirable results.

The non-fugitive component is present in an amount sufficient to provide improved aerial visibility of the composition when it is first aerially applied to the vegetation. However, the amount of the non-fugitive component is less than the amount which would prevent the fire retardant composition from being fugitive.

The non-fugitive component is dispersable or suspendable in the final fire retardant composition and in a liquid concentrate of such composition. The dispersability or suspendability of such a component is primarily dependent upon particle size and particle size distribution and the nature of the other components present in the fire retardant composition such as thickeners, etc.

Also, the chemical structure and characteristics of the non-fugitive component must be compatible with the other components, especially with the carrier liquid. It must be sufficiently chemically inert that it does not lose its functional capability when combined with the other components of the fire retardant composition. It should also be non-toxic, and, if colored, should not undesirably affect the hue established by the combination of the fire retardant components and the fugitive component.

For example, in the presently preferred practice of the invention we employ red iron oxide pigments as the non-fugitive component. Yellow iron oxide pigments, white pigments, such as titanium dioxide, and even uncolored materials such as melamine-formaldehyde powders and microscopic hollow glass spheres, can also be employed. Although colored pigments such as red or yellow iron oxide do not fade appreciably, the amounts of such pigments in the fire retardant compositions are small enough that the overall composition ultimately fades to a neutral color, i.e., substantially the same color which the composition would have exhibited if no fugitive colorant had been added, i.e., either colorless or a color which blends with color of the normal vegetation and/or ground in the drop zone.

For example, if a red fugitive component and red iron oxide (non-fugitive component) are employed, the initial color (second hue) of the resultant fire retardant composition will be red. If a red fugitive component and yellow iron oxide (non-fugitive component) are employed, the second hue will be orange. If a red fugitive component and a white non-fugitive component are employed, the second hue will be pink. Any of these second hues may provide sufficient contrast with the hue of the ground vegetation to provide acceptable aerial visibility. At present, we prefer to employ red iron oxide as the non-fugitive component, in combination with a red fugitive component, to form the colorant.

The maximum quantity of non-fugitive pigment which can be employed, which will still maintain the overall fugitive (fading) characteristics of the fire retardant composition, will vary, depending on the natural or "neutral" color of the fire retardant composition components and non-fugitive component and the natural colors of the terrain and vegetation. For example, if a blue-colored fire retardant composition such as that disclosed in the Lacey patent U.S. Pat. No. 3,960,735 is employed on darkly-colored blue-green vegetation, e.g., spruce fir, a greater quantity of a colored non-fugitive colorant, e.g., red iron oxide, can be employed. On the other hand, less of a colored non-fugitive component can be employed if the base composition is highly viscous or if the composition is applied on less highly colored vegetation or terrain, e.g., chapparal. It appears that the maximum quantity of colored non-fugitive component is higher when using a clay thickener than when using a gum thickener in the fire retardant composition. In general, it appears that the colored non-fugitive pigment can be no more than approximately 20–30 wt. % of the total colorant. The maximum amount of the total colorant employed will be less than the amount which would prevent the compositions from fading to a neutral color. These amounts can be determined by routine tests by persons skilled in the art having regard for this disclosure.

For example, the maximum amount of red iron oxide which can be employed, irrespective of the amount of fugitive component presently appears to be approximately 0.5 wt. % of the liquid concentrate formulations and about 0.10 wt. % in diluted mixed concentrate compositions. However, for any given base composition of fire retardant composition components (fire retardant salt, thickener, corrosion inhibitor, etc.), the optimum and maximum concentrations of colorant components can be determined by those skilled in the art without undue experimentation, having regard for the disclosure hereof. For example, suitable procedures for assessing the aerial visibility and fugitive fading characteristics of these compositions are set forth in Sections 3.8 and 4.3.7. of Specification 5100–304a, February 1986, U.S. Department of Agriculture Forest Service Specification for Long Term Retardant, Forest Fire, Aircraft or Ground Application.

DISCLOSURE OF THE CLOSEST PRIOR ART

The use of both a fugitive dye and a non-fugitive pigment in the same fire retardant composition is disclosed by the U.S. Pat. No. 3,960,735, issued Jun. 1, 1976 to Kathleen P. Lacey. In the Lacey patent (Example III) both "red iron oxide" and "6 BL dye" are included in a fire retardant concentrate composition. However, the primary coloring agent, red iron oxide, was present in an amount which was far in excess of that which would permit the composition to fade to a neutral color or to the hue which it would exhibit if the dye/iron oxide had not been added, i.e., the Lacey '735 compositions were not "fugitive". The 6 BL dye was added to the composition of Example III for the purpose of supplementing the red color of the iron oxide, i.e., making the composition "redder", because the iron cyanide blue corrosion inhibitor of Lacey (Col. 2, lines 5 et seq.) and the red iron oxide primary coloring agent otherwise provided a "purplish" composition.

A prior art fire retardant composition was known and used in the United States prior to our present invention, which may have included a colorant consisting of a mixture of a dye and a small quantity of $TiO_2$, encapsulated in a polymeric matrix. This prior composition was manufactured and shipped as a dry powder "concentrate" which was then diluted with water for field application. The quantity of $TiO_2$ in this product was only about 40–50 ppm in the final diluted concentrate, far less-than the amount required to provide the enhanced visibility achieved by the present invention.

The determination of whether the hue of the fugitive composition (second hue) fades to a neutral hue can be determined by the method described in Section 4.3.7.2 of Specification 5100–304a (February 1986), "USDA Forest Service Specification for Specification for Long Term Retardant, Forest Fire Aircraft or Ground Application".

The following examples are presented to further illustrate principles of my invention to those skilled in the art. These examples do not, however, constitute limitations on the scope of the invention, which is defined only by the appended claims.

EXAMPLE I

This example illustrates the practice of the invention in the manufacture of so-called "liquid concentrate"-type fire retardant products. The products are prepared in accordance with the procedure described in U.S. Pat. No. 3,960,735 to Kathleen P. Lacey, except that the colorant of the present invention is substituted for the red iron oxide—6 BL dye coloring agents described therein.

A concentrate composition is manufactured using two different types of ammonium polyphosphate liquid. The ingredients of each of these compositions are set forth in Tables A and B. Both of these compositions have improved aerial visibility in comparison to the same compositions which do not contain the red iron oxide pigment. However, these compositions have acceptable fading characteristics, i.e., fade to hues which are substantially the same as the compositions would exhibit without addition of the colorant.

TABLE A

| | Wt. % in Concentrate | Wt. % in Final Diluted (5:1) Composition |
|---|---|---|
| FIRE RETARDANT COMPONENTS | | |
| Ammonium Polyphosphate Liquid (11-37-0) | 99.3–78.6 | 22.2–17.58 |
| Attapulgite Clay (AA Special) | 0–10.0 | 0–2.24 |
| Corrosion Inhibitor Reagent(s), stabilizers, spoilage inhibitor(s), defoamer(s), etc. | 0–10.0 | 0–2.24 |
| COLORANT COMPONENTS | | |
| Fugitive Pigment (Day-Glo 122-9180) | 0.5–1.0 | 0.11–0.22 |
| Non-Fugitive Pigment (Titanium Dioxide) | 0.2–0.4 | 0.04–0.09 |
| LIQUID CARRIER | | |
| Water | None | Balance |
| TOTAL | 100.00 | 100.00 |

TABLE B

| | Wt. % in Concentrate | Wt. % in Final Diluted (4.25:1) Composition |
|---|---|---|
| FIRE RETARDANT COMPONENTS | | |
| Ammonium Polyphosphate Liquid (10-34-0) | 99.3–77.4 | 24.74–19.28 |
| Attapulgite Clay (AA Special) | 0–10.0 | 0–2.49 |
| Corrosion Inhibitor Reagent(s), stabilizers, spoilage inhibitor(s), defoamer(s), etc. | 0–10.0 | 0–2.49 |
| COLORANT COMPONENTS | | |
| Fugitive Pigment (Day-Glo 122-9180) | 0.5–2.0 | 0.12–0.50 |
| Non-Fugitive Pigment (Yellow Iron Oxide) | 0.2–0.6 | 0.05–0.15 |
| LIQUID CARRIER | | |
| Water | none | balance |
| TOTAL | 100.00 | 100.00 |

EXAMPLE II

This example illustrates the practice of the invention by the manufacture of so-called dry or powder concentrate compositions. These dry compositions are thereafter mixed with water to form a final diluted fire retardant composition suitable for aerial application. These compositions are manufactured in accordance with the methods disclosed in U.S. Pat. No. 4,176,071. The ingredients in each composition are set forth in Tables C, D and E. Each of these compositions has acceptable aerial visibility and fugitive fading characteristics.

TABLE C

| | Wt. % in Concentrate | Wt. % in Final Composition |
|---|---|---|
| FIRE RETARDANT COMPONENTS | | |
| Ammonium Sulfate | 78.20 | 14.5 |
| Diammonium Phosphate | 3.78 | 0.7 |
| Guar Gum | 4.20 | 0.8 |
| Xanthan Gum | 0.11 | 0.2 |
| Corrosion Inhibitors | 1.08 | 0.20 |
| Spoilage Inhibitor | 0.54 | 0.10 |
| Defoamer/Anti-Oxidant | 10.79 | 2.00 |
| COLORANT COMPONENTS | | |
| Fugitive Pigment | 1.08 | 0.20 |
| Non-Fugitive Pigment (Red Iron Oxide) | 0.22 | 0.04 |
| LIQUID CARRIER | | |
| Water | none | balance |
| | 100.00 | 100.00 |

TABLE D

| | Wt. % in Concentrate | Wt. % in Final Composition |
|---|---|---|
| FIRE RETARDANT COMPONENTS | | |
| Ammonium Sulfate | 24.52 | 3.2 |
| Diammonium Phosphate | 65.90 | 8.6 |
| Guar Gum | 5.98 | .8 |
| Stabilizer/corrosion inhibitor | 2.30 | .3 |
| COLORANT COMPONENTS | | |
| Fugitive Pigment | 1.00 | 0.13 |
| Non-Fugitive Pigment (Red Iron Oxide) | 0.30 | 0.04 |
| LIQUID CARRIER | | |
| Water | None | Balance |
| TOTAL | 100.00 | 100.00 |

TABLE E

| | Wt. % in Concentrate | Wt. % in Final Composition |
|---|---|---|
| FIRE RETARDANT COMPONENTS | | |
| Ammonium Sulfate | 64.15 | 8.5 |
| Diammonium Phosphate | 24.15 | 3.2 |
| Guar Gum | 6.00 | .8 |
| Spoilage inhibitor | 0.75 | .1 |
| Stabilizer/corrosion inhibitor | 0–3.77 | 0–0.5 (variable) |
| COLORANT COMPONENTS | | |
| Fugitive Pigment | 0.98 | 0.13 |
| Non-Fugitive Pigment (Red Iron Oxide) | 0.20 | 0.03 |
| LIQUID CARRIER | | |
| Water | None | Balance |
| TOTAL | 100.00 | 100.00 |

EXAMPLE 3

This example illustrates the practice of the invention in the manufacture of fugitive compositions of the general type disclosed in U.S. Pat. No. 4,983,326. A blended dry powder concentrate is prepared in accordance with Example 4B of the '326 patent. The dry concentrate is mixed with water to form an intermediate low-viscosity liquid concentrate, which is then further diluted to form a high-viscosity final mixed fire retardant composition having improved aerial visibility in comparison to the same compositions without the iron oxide pigment and has acceptable "fugitive" fading characteristics. Table F depicts the weight percentages of the components of the dry concentrate, intermediate liquid or so-called "fluid" concentrate and the final diluted mixed retardant composition.

TABLE F

| | Dry Conc | Liq Conc | Final Mix |
|---|---|---|---|
| FIRE RETARDANT COMPONENTS | | | |
| Monoammonium phosphate | 52.24 | 24.46 | 5.62 |
| Diammonium phosphate | 34.81 | 16.30 | 3.74 |
| guar gum | 7.24 | 3.39 | 0.78 |
| sodium molybdate | 0.19 | 0.09 | 0.02 |
| tricalcium phosphate | 2.01 | 0.94 | 0.22 |
| sodium silicofluoride | 0.47 | 0.22 | 0.05 |
| mercaptobenzothiazole | 0.30 | 0.14 | 0.03 |
| dimercaptothiadiazole | 0.72 | 0.34 | 0.08 |
| Polyalkylene derivatives of propylene glycol | 0.13 | 0.06 | 0.01 |
| COLORANT | | | |
| Fugitive component | 1.61 | 0.75 | 0.17 |
| Red Iron Oxide | 0.28 | 0.13 | 0.03 |
| LIQUID CARRIER | | | |
| Water | none | 53.18 | balance |
| Total | 100 | 100 | 100 |

BEST MODE OF THE INVENTION

Example 4 illustrates the best mode presently known to us for practicing our invention. Each of the products described in Examples 4 and 5 has acceptable aerial visibility and fugitive fading. If the red iron oxide is deleted from the compositions or reduced below about 0.20 wt % in the concentrate, the compositions will not have acceptable aerial visibility, even if the red iron oxide deleted is replaced by equal amounts of the fugitive pigment. If the fugitive pigment is eliminated or reduced and the red iron oxide content is increased to provide sufficient aerial visibility, then the compositions do not have acceptable the fugitive fading.

EXAMPLE 4

The following compositions were prepared in accordance with method described in the U.S. Pat. No. 3,960,735 to Kathleen P. Lacey, except that the colorant of the present invention is substituted for the coloring agents described therein. The ingredients used in preparing the liquid concentrates and the final diluted mixed fire retardant are listed in Table G, H and I.

TABLE G

| | wt % in liquid concentrate | wt % in diluted mixed retardant |
|---|---|---|
| FIRE RETARDANT COMPONENTS | | |
| Ammonium Polyphosphate Liquid (Arcadian 11-37-0) | 90.60 | 20.29 |
| Attapulgite Clay (Floridin AA Special) | 3.50 | 0.78 |
| Sodium Ferrocyanide (Wego Technical) | 4.50 | 1.01 |
| COLORANT | | |
| Fugitive Pigment (Day-Glo #122-9180) | 1.00 | 0.22 |
| Non-Fugitive Pigment (Mobay Corp. Bayferrox Red Iron Oxide 130M) | 0.40 | 0.09 |
| LIQUID CARRIER | | |
| Water | none | balance |
| TOTAL | 100.00 | 100.00 |

TABLE H

| | wt % in liquid concentrate | wt % in diluted mixed retardant |
|---|---|---|
| FIRE RETARDANT COMPONENTS | | |
| Ammonium Polyphosphate Liquid (Simplot 10-34-0) | 90.70 | 22.98 |
| Attapulgite Clay (Floridin AA Special) | 4.00 | 1.01 |
| Sodium Ferrocyanide (Wego Technical) | 3.90 | 0.99 |
| COLORANT | | |
| Fugitive Pigment (Day-Glo #122-9180) | 1.00 | 0.25 |
| Non-Fugitive Pigment (Mobay Corp. Bayferrox Red Iron Oxide 130M) | 0.40 | 0.10 |
| LIQUID CARRIER | | |
| Water | none | balance |
| TOTAL | 100.00 | 100.00 |

TABLE I

| | wt % in liquid concentrate | wt % in diluted mixed retardant |
|---|---|---|
| FIRE RETARDANT COMPONENTS | | |
| Ammonium Polyphosphate Liquid (Macgregor 11-37-0) | 90.60 | 21.10 |
| Attapulgite Clay (Floridin AA Special) | 3.50 | 0.82 |
| Sodium Ferrocyanide (Wego Technical) | 4.50 | 1.05 |
| COLORANT | | |
| Fugitive Pigment (Day-Glo #122-9180) | 1.00 | 0.23 |
| Non-Fugitive Pigment (Mobay Corp. Bayferrox Red Iron Oxide 130M) | 0.40 | 0.09 |

TABLE I-continued

| | wt % in liquid concentrate | wt % in diluted mixed retardant |
|---|---|---|
| LIQUID CARRIER | | |
| Water | none | balance |
| TOTAL | 100.00 | 100.00 |

EXAMPLE 5

This example illustrates the practice of the invention by the manufacture of liquid concentrate products from ammonium polyphosphate liquids, using non-fugitive components other than red iron oxide. These compositions have acceptable aerial visibility and fugitive fading characteristics. The compositions are prepared in accordance with the procedure of Example 1, with the components listed in Table J and Table K.

TABLE J

| | Wt. % in concentrate | Wt. % in solution |
|---|---|---|
| Ammonium Polyphosphate (11-37-0) | 90.6 | 20.26 |
| Attapulgite Clay | 3.5 | 0.78 |
| Corrosion inhibitor | 4.5 | 1.01 |
| Water | None | balance |
| Fugitive pigment | 1.0 | 0.22 |
| Titanium dioxide | 0.4 | 0.09 |

TABLE K

| | Wt. % in concentrate | Wt. % in solution |
|---|---|---|
| Ammonium Polyphosphate (10-34-0) | 90.7 | 22.83 |
| Attapulgite Clay | 4.0 | 1.01 |
| Corrosion inhibitor | 3.9 | 0.99 |
| Water | None | balance |
| Fugitive pigment | 1.0 | 0.25 |
| Yellow iron oxide | 0.4 | 0.10 |

EXAMPLE 6

This example illustrates the practice of the invention by the manufacture of dry concentrate products from ammonium phosphate and ammonium sulfate, using non-fugitive components other than red iron oxide. These compositions have acceptable aerial visibility and fugitive fading characteristics. The compositions are prepared in accordance with the procedure Example 2, with the components listed in Tables L–O.

TABLE L

| | Wt. % in concentrate | Wt. % in solution |
|---|---|---|
| Ammonium sulfate | 94.47–82.21 | 14.70 |
| Diammonium phosphate | 4.56–3.97 | 0.71 |
| Guar gum | 0–4.47 | 0–0.8 |
| Stabilizer(s)/corrosion inhibitor(s)/spoilage inhibitor(s), defoamer(s), etc. | 0–8.40 | 0–1.5 |

TABLE L-continued

| | Wt. % in concentrate | Wt. % in solution |
|---|---|---|
| fugitive pigment | 0.84–0.73 | 0.13 |
| yellow iron oxide | 0.13–0.22 | 0.02–0.04 |
| Water | None | 84.44–82.14 |

TABLE M

| | Wt. % in concentrate | Wt. % in solution |
|---|---|---|
| Ammonium sulfate | 93.90–83.44 | 10.00–20.00 |
| Diammonium phosphate | 4.69–6.25 | 0.50–1.50 |
| Guar gum | 0–4.47 | 0–0.8 |
| Stabilizer(s)/corrosion inhibitor(s)/spoilage inhibitor(s), defoamer(s), etc. | 0–6.26 | 0–1.5 |
| fugitive pigment | 1.22–0.54 | 0.13 |
| titanium dioxide | 0.19–0.17 | 0.02–0.04 |
| Water | None | 89.35–76.03 |

TABLE N

| | Wt. % in concentrate | Wt. % in solution |
|---|---|---|
| Ammonium sulfate | 71.61–59.98 | 8.5 |
| Diammonium phosphate | 26.96–22.58 | 3.2 |
| Guar gum | 0–5.65 | 0–0.8 |
| Stabilizer(s)/corrosion inhibitor(s)/spoilage inhibitor(s), defoamer(s), etc. | 0–10.59 | 0–1.5 |
| fugitive pigment | 1.09–0.92 | 0.13 |
| yellow iron oxide | 0.34–0.28 | 0.04 |
| Water | None | 88.13–85.83 |

TABLE O

| | Wt. % in concentrate | Wt. % in solution |
|---|---|---|
| Ammonium sulfate | 69.47–53.53 | 14.00–5.00 |
| Diammonium phosphate | 29.78–20.02 | 6.0–1.87 |
| Guar gum | 0–4.47 | 0–0.8 |
| Stabilizer(s)/corrosion inhibitor(s)/spoilage inhibitor(s), defoamer(s), etc. | 0–16.06 | 0–1.5 |
| fugitive pigment | 1.65–1.40 | 0.13 |
| titanium dioxide | 0.10–0.43 | 0.02–0.04 |
| Water | None | 79.85–90.66 |

EXAMPLE 7

This example illustrates methods for objectively determining the color attributes of fire retardant compositions and the fading characteristics of various compositions upon exposure to sunlight.

TESTING METHODS

Various fire retardant compositions prepared in accordance with the prior art and in accordance with the foregoing Examples are prepared. Samples of these compositions are exposed to natural sunlight and the color attributes of the samples are measured at regular intervals during the test.

Fading Studies

The liquid fire retardant samples are applied to plate glass test panels measuring 5 inches wide, 30 inches long and 0.25 inches thick. A minimum coating thickness of 0.022 inch on each plate is obtained using a Gardner Knife (Gardner Lab, Inc., Bethesda, Md.). The test panels are exposed to natural light in accordance with ASTM G-24, Standard Recommended Practice for Conducting Natural Light Exposures. Color attributes of the test plates are obtained immediately after applying the retardant and then at selected intervals during the natural light exposure period. Color attributes are measured in accordance with ASTM E 805-93 (Standard Practice for Color Measurement) using a HunterLab Miniscan XE Model 45/0-L. All measurements with the Miniscan XE use D65 illuminant and 10 observer.

Capacity Measurements

Opacity is defined as the ability of a thin film of wildland fire retardant formulation to attenuate visible light. Opacity is measured in the laboratory by forming a retardant film of known thickness between two clear plastic sheets. The sample is placed against a white background (L*=100) and the CIE Y reflectance is measured in accordance with ASTM E 805-93 (Standard Practice for Color Measurement) and references therein using a HunterLab Miniscan XE Model 45/0-L. The sample is then placed against a black background (L*=0) and the color attributes measured. The opacity is calculated as the percentage (CIE Yblack/CIE Ywhite)×100.

Aerial Application

U.S. Forest Service Agency Air Attack Specialists determine the location of wildfire application sites. Observations are begun as soon as practical after the fire is controlled and access can be obtained. Observations and photographic records are made from the ground and from the air. Samples of vegetation to which the retardant formula is applied are obtained.

RESULTS

Plots of the color attributes vs. time show that the samples of compositions of the present invention fade and become substantially neutral in color relative to reference formulas containing only red iron oxide as the colorant.

Compositions of Lacey '735 Patent Distinguished

Figure 2:
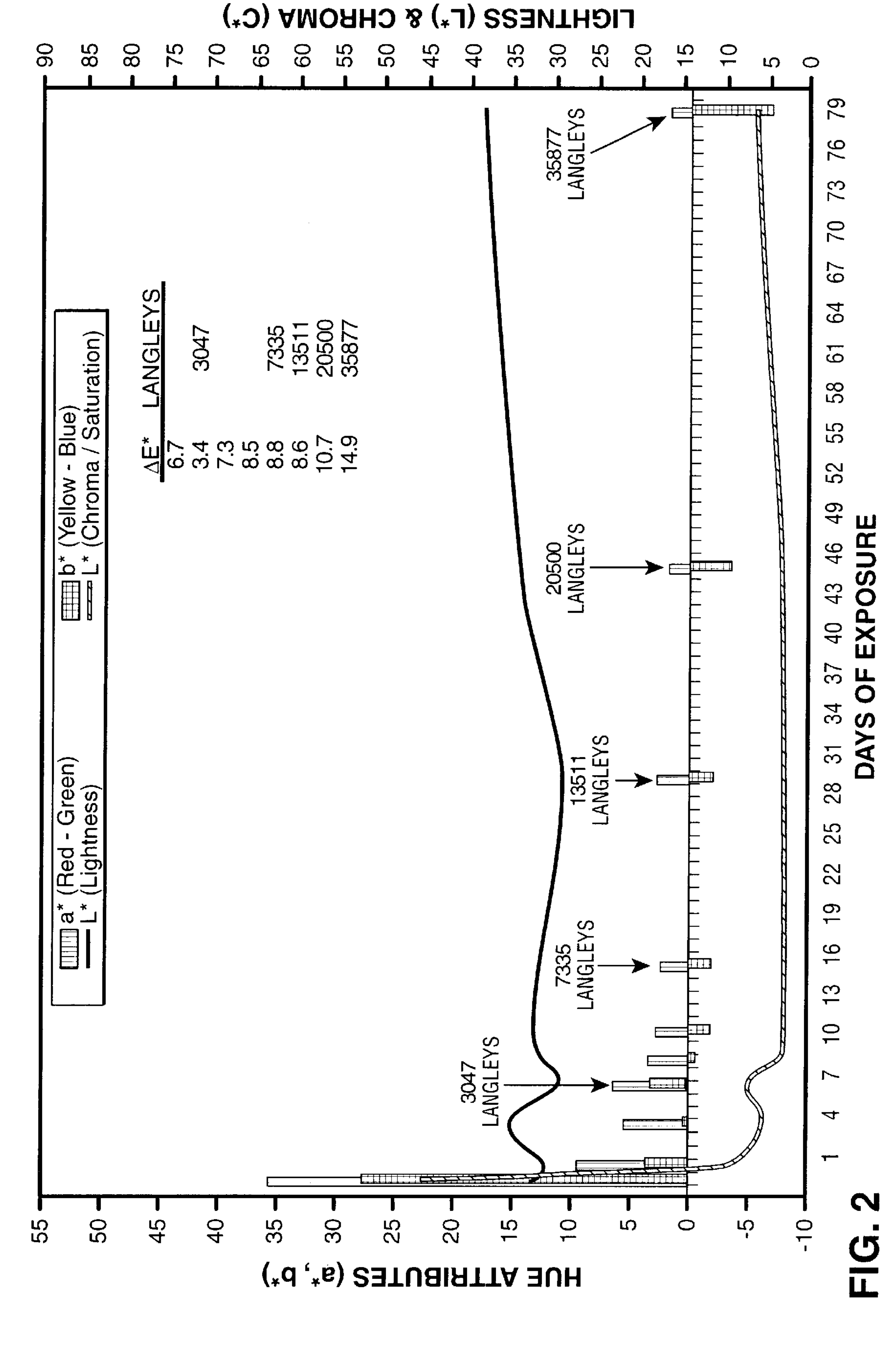
FIG. 2 illustrates the fading characteristics of a composition of the present invention which is identical to the composition of FIG. 1, except that the fugitive and non-fugitive components are those disclosed in Example 4, Table G.

The data demonstrate that the Lacey '735 patent composition and the identical composition with the colorant composition of the present invention are clearly and unambiguously distinguishable. FIG. 1, the graph of color attributes versus time, i.e. the fading graph, for the Lacey '735 patent formulation shows that the color is stable over the exposure period does not fade. This is shown by the values of ΔE* which remain within the range of 1.0 to 4.6 and show no trend during exposure. The amount of iron oxide in the Lacey formulation is so great that the resulting composition is not fugitive. However, as illustrated in FIG. 2, the identical composition, except with the colorant composition of Example 4, Table G, fades dramatically over the time period and shows a clear trend in LE* from 6.7 to 14.9 during the exposure period.

Aerial Application

The formulas of Example 4, Table G are applied to several vegetation types from aircraft and the fading performance is monitored. The results of these observations show that the formulas fade to their non-contrasting, first hue condition. This process occurs between one week and eight months depending on the formula and the location of the site relative to incident sunlight.

Effect of Refractive Index of Non-Fugitive Component

Figure 3:
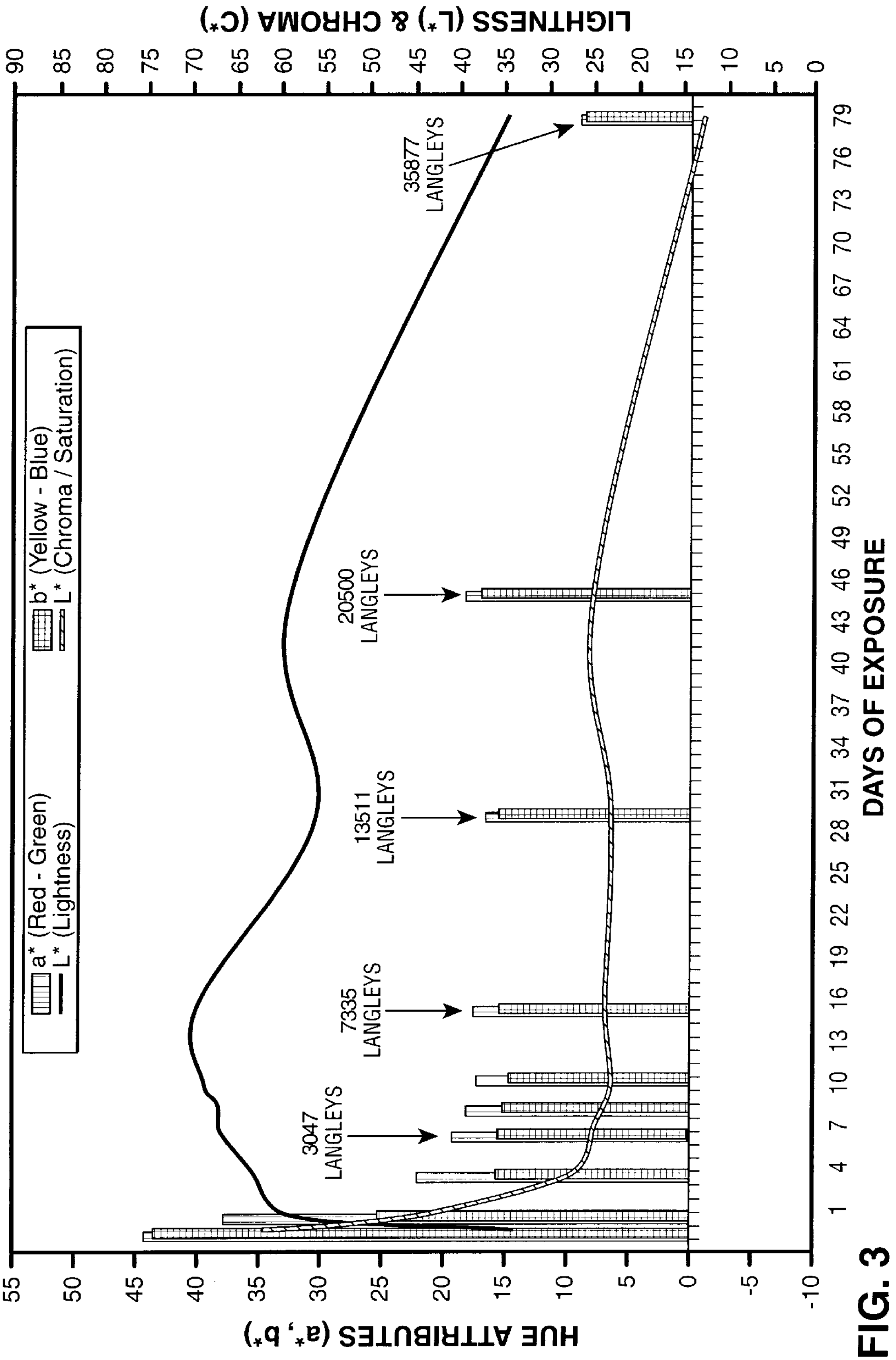
FIG. 3 illustrates the fading characteristics of another composition of the present invention, as disclosed in Example 2, Table D, employing red iron oxide as the non-fugitive component.

FIG. 3 shows the fading graph of the composition of Example 2, Table D. This composition contains 0.13% of a fugitive component and 0.03% of a non-fugitive component, in this case red iron oxide, refractive index 3.01. The Opacity of this formula is 18.8. Observations of aerial application of this formula show that it has sufficient conspicuity and that the Opacity is adequate. The fading graph, FIG. 3, shows that this formulas fades over time with values of E* showing a clear trend from 18.7 to 41.0. These date show that a lesser quantity of a higher refractive index non-fugitive component is required to achieve desirable results.

Figure 4:
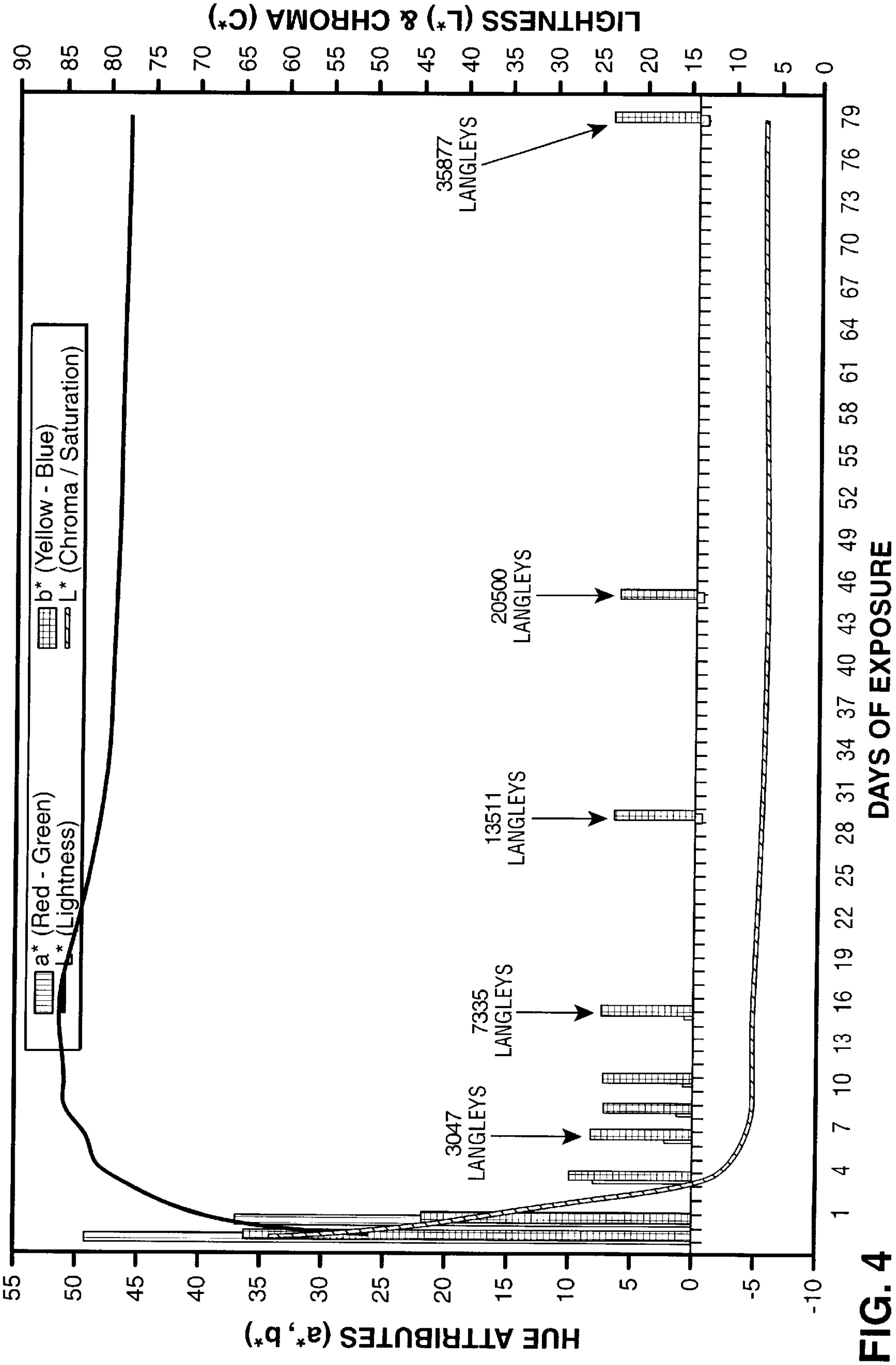
FIG. 4 illustrates the fading characteristics of the composition of FIG. 3, except that the non-fugitive component is uncolored melamine-formaldehyde polymer powder.

FIG. 4 is the fading graph of the same composition as FIG. 3, but containing 0.13% of a fugitive component and 1.76% of uncolored melamine-formaldehyde plastic powder, refractive index about 1.5. The opacity of this formula is 40.7, which indicates adequate conspicuity following aerial application. The fading graph shows that this formula fades very quickly over time. The fugitive component fades more quickly in this formula because the lower refractive index and the lack of color of the non-fugitive component attenuate the incident radiation to a lesser extent. These data show that a greater quantity of lower-index materials is required to achieve desirable results.

Figure 5:
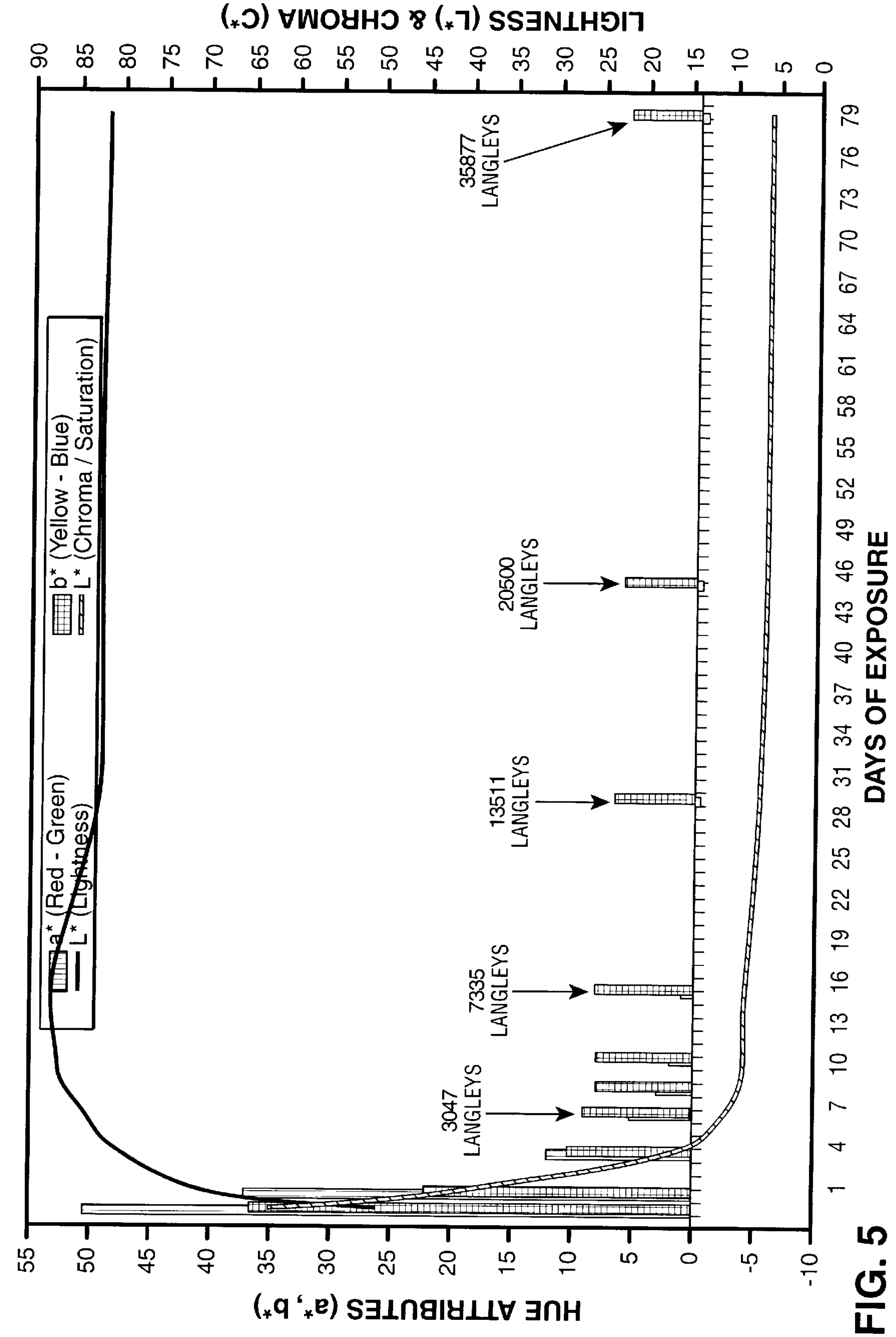
FIG. 5 illustrates the fading characteristics of the composition of FIG. 3, except that the non-fugitive component is microscopic hollow glass spheres.

FIG. 5 shows the fading graph of the same composition as FIG. 3, but containing 0.13% of a fugitive component and 1.50% of microscopic hollow glass spheres, refractive index 1.52. The opacity of this formula is 38.8, which indicates adequate conspicuity following aerial application. The fading graph shows that this formula fades very quickly over time. Again, the fugitive component fades more quickly in this formula because the lower refractive index and the lack of color of the non-fugitive component attenuate the incident radiation to a lesser extent. These data show that a greater quantity of lower-index materials is required to achieve desirable results.

Having described our invention in such terms as to enable those skilled in the art to make and use it and, having identified the presently preferred embodiments and best modes thereof, we claim:

1. A fugitive color fire retardant composition for aerial application to ground vegetation, said composition comprising:

a) fire retardant components having a first hue, including a fire retardant salt;

b) a colorant which initially colors said composition to a second hue which contrasts with the hue of said vegetation, said colorant comprising i) a fugitive color component, and ii) a non-fugitive component insoluble in an aqueous carrier, present in said composition in an amount which improves the aerial visibility of said composition, but in less than an amount which prevents said composition from fading to a neutral color after aerial application.

2. The composition of claim 1 in which said non-fugitive component is red iron oxide.

3. The composition of claim 1, in which said fire retardant salt comprises a liquid ammonium polyphosphate and said non-fugitive component is red.

4. The composition of claim 1, including an aqueous liquid carrier.

* * * * *